W. SYKES.
GRADING MACHINE.
APPLICATION FILED JULY 15, 1910.

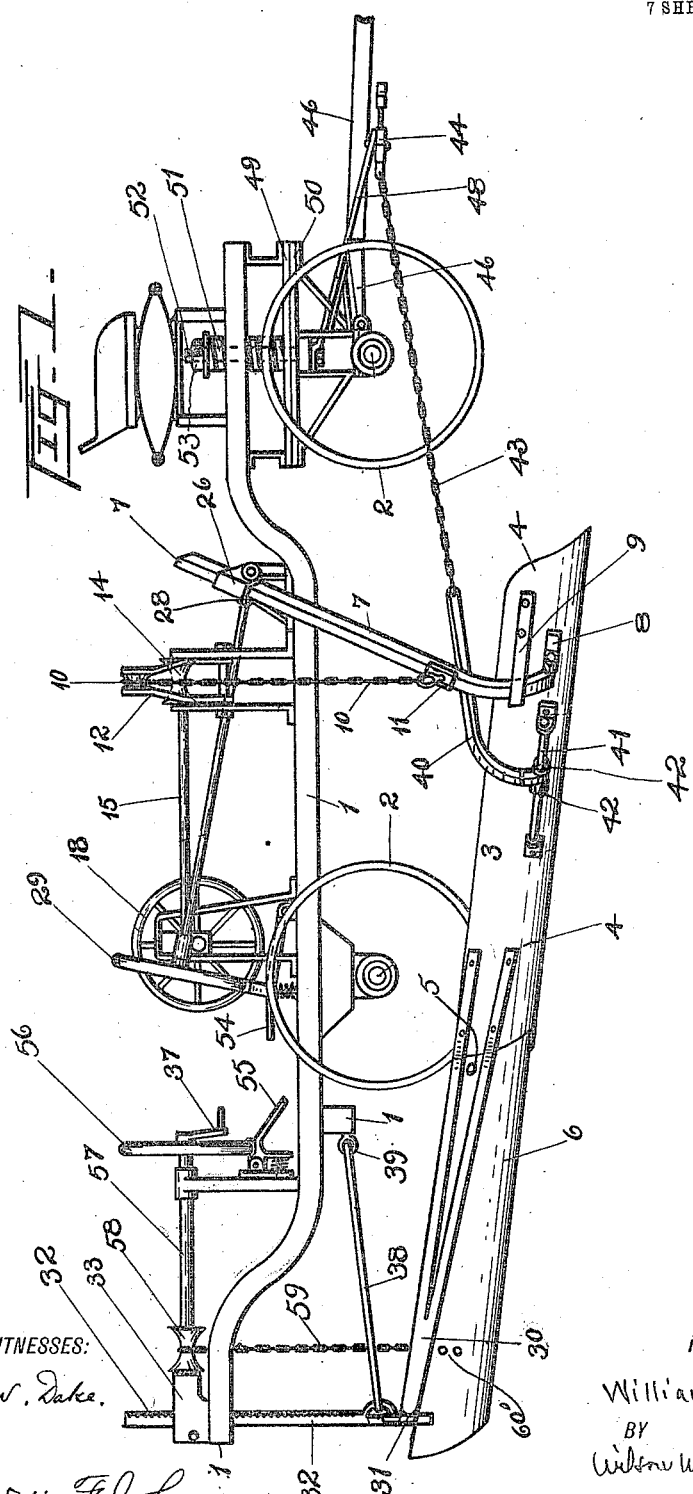

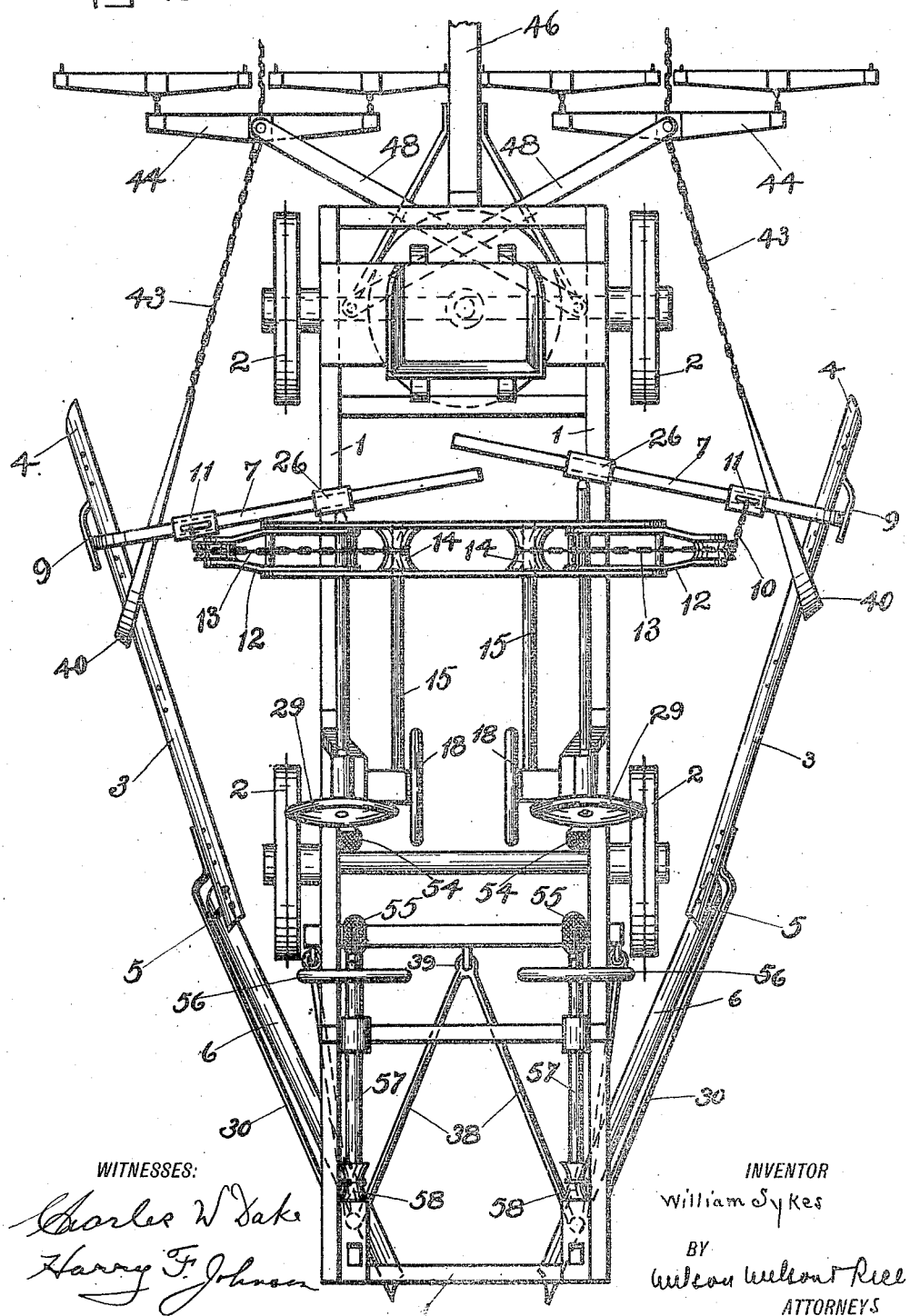

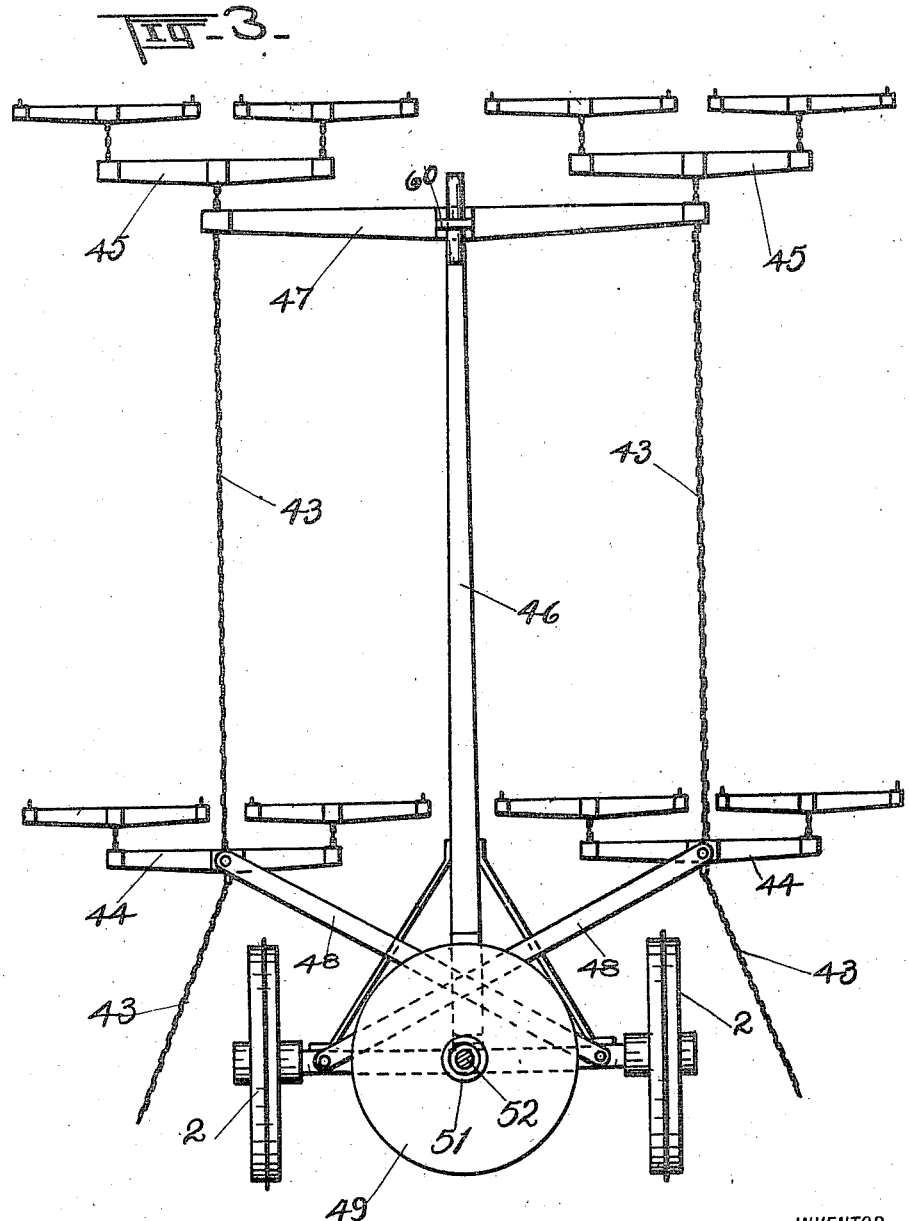

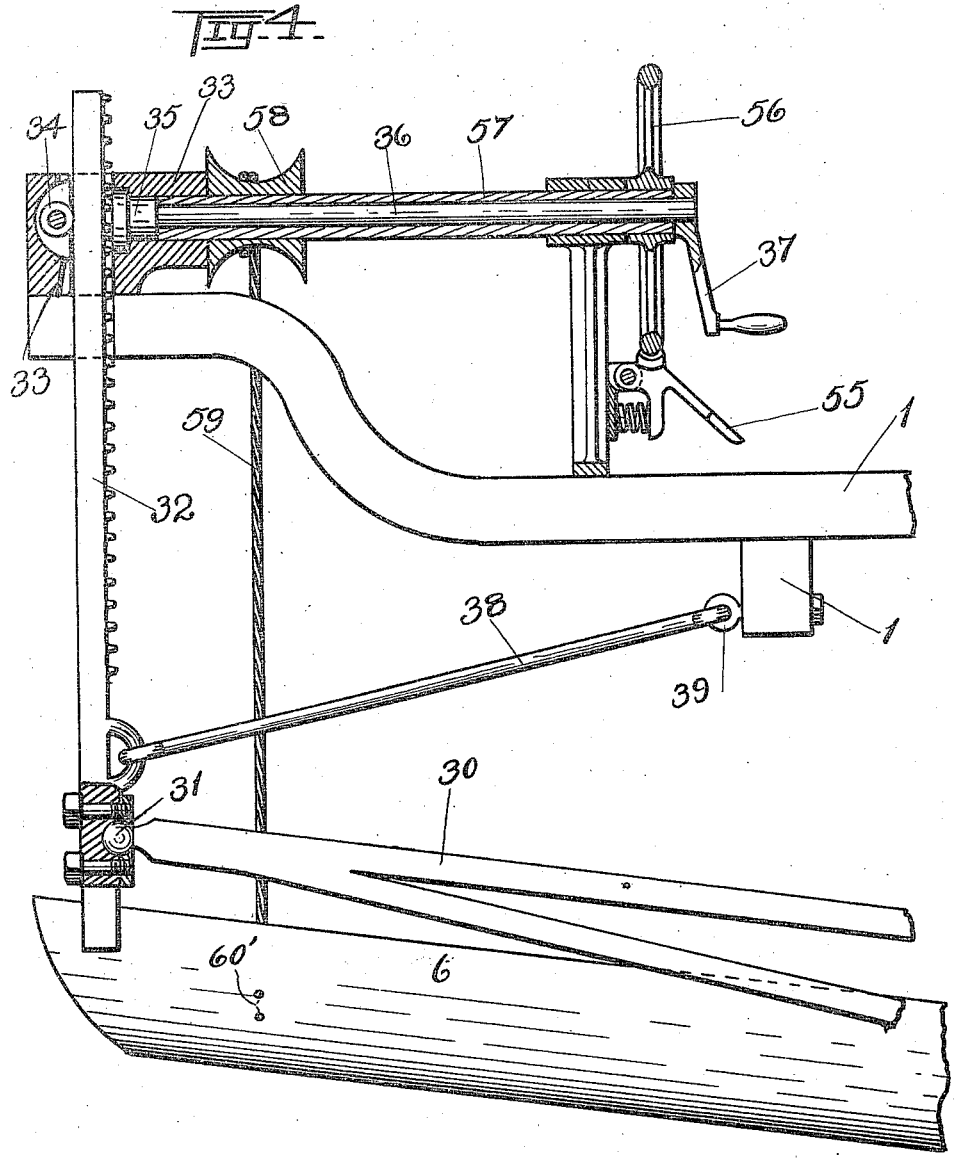

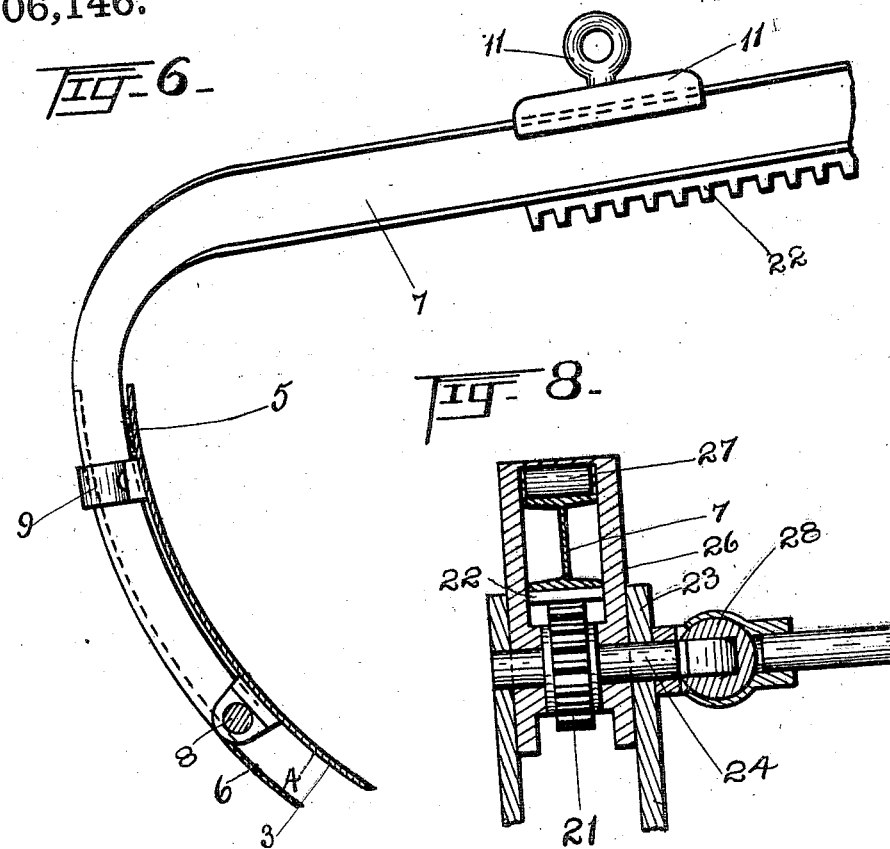
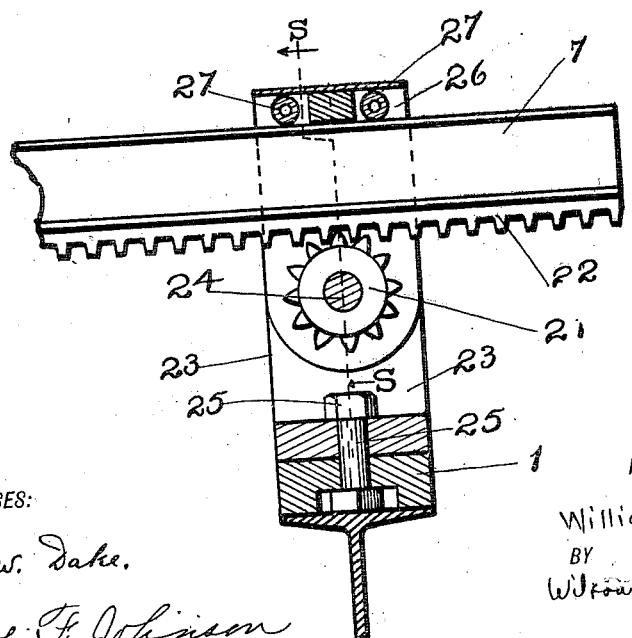

1,006,146.

Patented Oct. 17, 1911.
7 SHEETS—SHEET 6.

WITNESSES:
Charles W. Dake.
Harry F. Johnson

INVENTOR
William Sykes
BY
Wilson, Wilson & Rice
ATTORNEYS

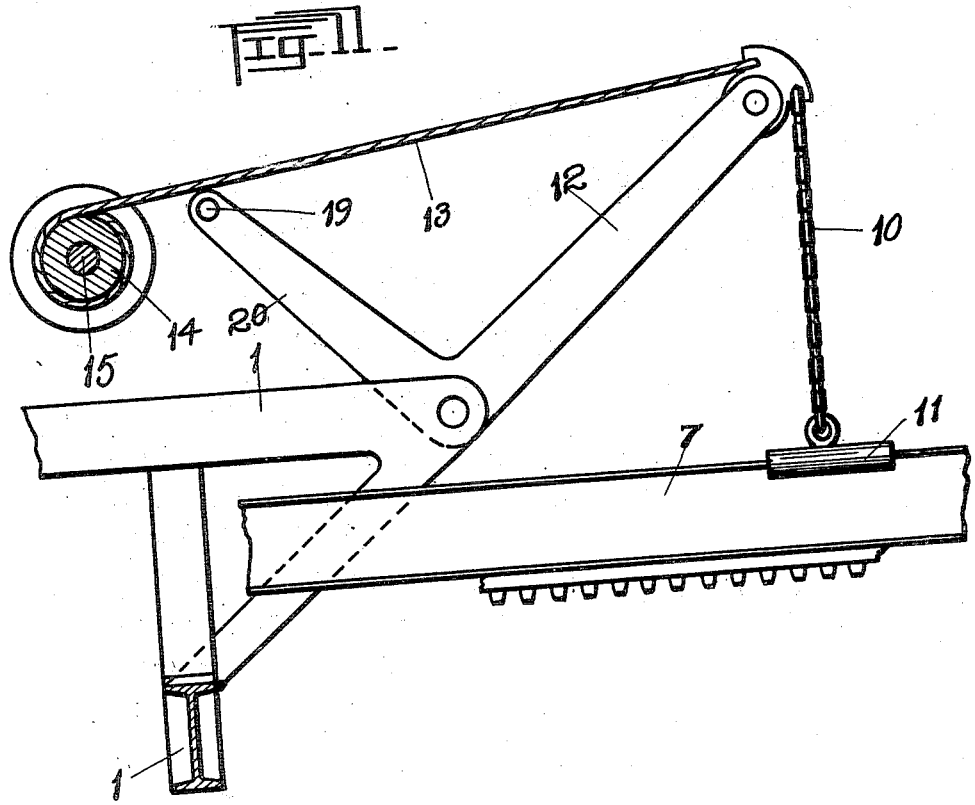

UNITED STATES PATENT OFFICE.

WILLIAM SYKES, OF JACKSON, MISSISSIPPI.

GRADING-MACHINE.

1,006,146.

Specification of Letters Patent. Patented Oct. 17, 1911.

Application filed July 15, 1910. Serial No. 572,220.

*To all whom it may concern:*

Be it known that I, WILLIAM SYKES, a citizen of the United States, and resident of the city of Jackson, in the county of Hinds and State of Mississippi, have invented new and useful Improvements in Grading-Machines, of which the following is a specification.

My invention relates to grading machines, and its principal object is to provide an improved machine of that character in which the scrapers for loosening and distributing the earth shall be operated through direct traction connections with the motive power, being nevertheless adjustable to a desired operative position. This, and other objects appearing hereinafter, are attained by, and my invention is preferably embodied in, the following described mechanism, illustrated by the accompanying drawings, in which—

Figure 9:
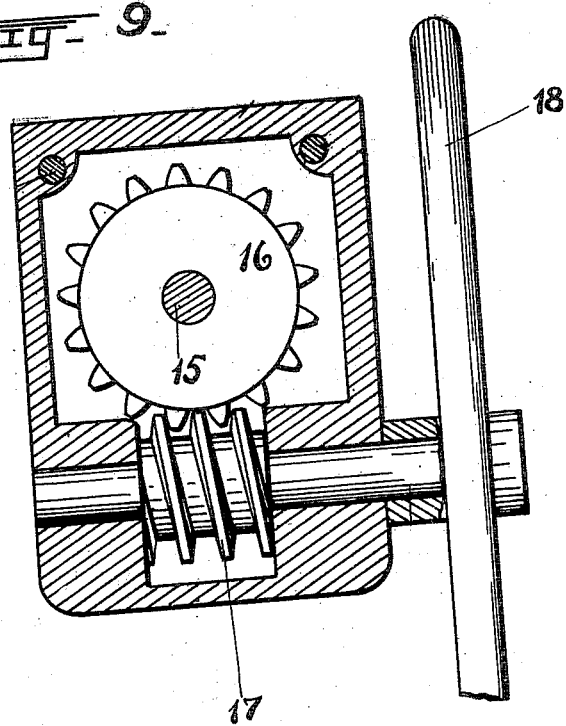
Figure 10:
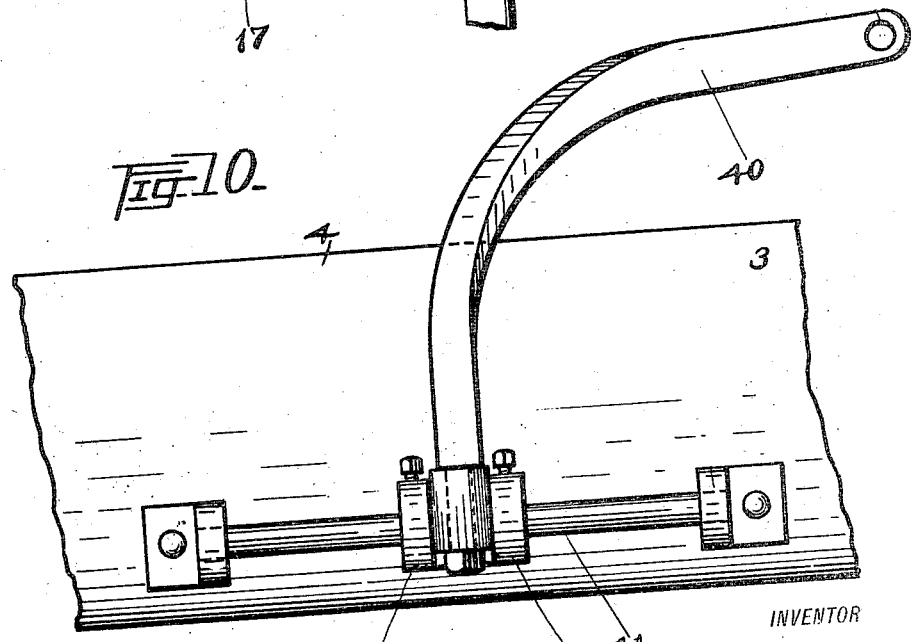

Figure 1 is a side elevation of my grading machine, showing the parts on the right-hand half of the machine only, the like parts on the left-hand half being omitted for the sake of clearness; Fig. 2 is a plan view of my grading machine; Fig. 3 is a like view of its forward axle with connected parts, illustrating the traction connections; Fig. 4 is an enlarged right side elevation, partly in vertical section, of the rearward portion of my machine; Fig. 5 is an enlarged detail view of the face worm by which the rear end of the main scraper member is raised and lowered; Fig. 6 is an enlarged detail front view of the outer portion of the right-hand scraper's forward-supporting and laterally-adjusting arm with connected parts, the main scraper member appearing in vertical section; Fig. 7 is a detail enlarged view, partly in vertical section, of the gearing and connections, whereby the scrapers are adjusted laterally; Fig. 8 is a vertical section of the same on a line corresponding with line S—S of Fig. 7; Fig. 9 is an enlarged detail view of the gearing whereby the forward end of the scraper is raised and lowered; Fig. 10 is an enlarged detail view of the pivotal connection between the scraper and the curved arm of its traction connections, and Fig. 11 is a front view of the devices whereby the supporting and laterally-adjusting arm is raised and lowered.

A suitable vehicle body 1, traveling on wheels 2, carries the scrapers for loosening and distributing the earth and their supporting and adjusting means. Inasmuch as like scrapers and means are thus carried on each side of the vehicle, I shall, for brevity and clearness, describe those carried on one side as shown in Fig. 1, wishing it understood that a like arrangement is provided on the other side of the vehicle.

The earth is loosened and distributed by a scraper 3, having a main or forward member 4, to which is pivoted at 5, to turn vertically, an auxiliary or rearward member 6. The forward end of the scraper is supported at a desired height, and is adjusted laterally to a desired position by a transversely extending arm 7 pivoted at 8 to said main member near its lower edge, as shown: a spring 9 pressing the scraper on said pivot to the position shown in the drawings, is adapted to yield should the lower edge of the scraper strike an unusual obstruction, thus allowing the scraper to turn on such pivot to prevent its injury.

The transverse arm 7 is supported, and may be raised or lowered to adjust the scraper vertically, by a cable 10 having a slider connection 11 slidable longitudinally on the arm, and attached at its upper end to the outer arm 12 of a bent lever (shown particularly in Fig. 11) fulcrumed on the vehicle body. The cable 13 attached to said arm 12, is wound on a drum 14 carried by the shaft 15 whose worm gear 16 is turned by its engaging worm 17 on the shaft of the hand-wheel 18, as particularly shown in Fig. 9. It will be seen that when the scraper is lowered sufficiently by turning this hand-wheel, the forked end 19 of the inner arm 20 of the bent lever will engage the cable 13, thus providing a more effective supporting line for the cables 10 and 13 than where a single arm lever is used. The transverse arm 7 may be thrust longitudinally to adjust and retain the scraper in a desired lateral position, by the gear 21 meshing with a rack 22 carried by the arm 7. The bearing-block 23 of this gear's shaft 24 is vertically swiveled at 25 on the vehicle body. A guide 26, in form a stirrup, embracing the arm 7 and having anti-friction rolls 27, is pivoted on the shaft 24, and serves to retain the arm's rack in engagement with its gear. A suitable universal joint 28 of common form couples the gear's shaft 24 with that of the hand-wheel 29, whereby the scraper may be laterally adjusted. The main scraper member 4 has a rearwardly-extending beam 30, having the braced construction shown, whose extremity is pivoted, as by a ball and socket joint 31, on the lower end of a rack beam 32, slidable vertically in a guide 33 carried by the vehicle body, and provided with an anti-friction roll 34. The teeth of this rack are engaged by the spiral or face-worm 35 carried by a shaft 36 which has a crank 37, by turning which the rearward end of the main scraper member may be adjusted and retained in a desired vertical position.

To the lower end of the rack beam 32 is pivoted a brace having forwardly-diverging arms 38 pivoted at 39 on the vehicle body, thus affording lateral bracing for the rack beam. The shaft 36 rotates in a hollow shaft 57, provided with a hand-wheel 56, which hollow shaft rotates in bearings on the vehicle body and carries a drum 58 on which is wound a cable 59 attached at 60' to the auxiliary scraper member 6, and thus supports its free end at a desired height.

The entire machine is drawn forward to effect the grading by traction connections operating on the scrapers directly, and not through the medium of the vehicle body. Such connections are in the construction shown as follows: A curved arm 40 passing over the scraper is pivoted in the manner particularly shown in Fig. 10 on a horizontal rod 41 carried on the rear side of the main scraper member, as near its lower edge and as near the connection of the supporting arm 7 with such scraper member as conveniently may be. The curved arm being slidable on the rod 41, may be adjusted to a desired position longitudinally thereof, as by screw-set collars 42. A traction cable 43 connects the curved arm with the double tree 44 for the rear span of horses, where animal motive power is used, and continuing forward is attached to the double tree 45 for a fore span. The same arrangement is, of course, made on each side of the vehicle, as shown, the forward double trees 45 being held in a proper position relatively to each other and to the tongue 46 of the vehicle by a spreader 47 to which the chains are attached, and which has, at its center, a sliding engagement 60 with the tongue. The rear double tree on each side is positioned laterally by a spreader beam 48 connected at one end with the middle point of the tree and pivoted at the other end on the opposite side of the vehicle. It will be seen that the trees are thus tractionally connected directly with the scrapers and that the vehicle body is drawn or pushed forward by the braces 38. To relieve strains, the upper and lower members 49 and 50 of the fifth wheel are yieldingly held together by a helical spring 51 encircling the king pin 52, and pressing between the upper member 49 and the king pin's nut 53. Suitable pedal friction-brakes 54 and 55 engage the hand-wheels 29 and 56 respectively.

Not confining myself to the details of construction shown and described, I claim:

1. In a grading machine, a vehicle body, a scraper connected to the body and at its forward end adjustable laterally in relation to the body, and traction connections directly with the forward adjustable end of the scraper.

2. In a grading machine, a vehicle body, a scraper adapted to move the excavated earth inwardly and toward the vehicle body, means intermediate the body and scraper to adjustably hold the scraper relatively to the body, and traction connections directly with the scraper.

3. In a grading machine, a vehicle body, a scraper on each side thereof having connected toward its fore end a supporting arm, means intermediate the body and arm to adjustably hold it laterally in relation to the body, means intermediate the body and arm for raising and lowering the outer end of the arm, and means intermediate the body and the rear end of the scraper for raising and lowering the same.

4. In a grading machine, a vehicle body, a scraper having fore and rear members pivoted together to turn vertically and having connected to the fore member a supporting arm, means intermediate the body and arm to adjustably hold it in lateral relation to the body, means intermediate the body and arm for raising and lowering the outer end of the arm, means intermediate the body and the rear end of the fore member for raising and lowering the same, and means intermediate the body and the rear end of the rear member for raising and lowering the same.

5. In a grading machine having a vehicle body and a scraper, a supporting and laterally-adjusting arm connected to the scraper and longitudinally movable on the body and having a rack, a gear meshing with the rack to so move the arm, a slider slidable longitudinally the arm, and connections intermediate the body and the slider for raising and lowering the arm and scraper.

6. In a grading machine having a vehicle body and a scraper, a supporting and laterally-adjusting arm connected to the scraper and longitudinally movable on the body and having a rack, a gear meshing with the rack to so move the arm, a slider slidable longitudinally the arm, a bent lever fulcrumed on the body, a cable attached to the slider and one of the arms of the lever, and, for raising the scraper, a cable attached to said lever arm and adapted to engage the other arm of the lever in the lowered position of the scraper and to disengage it in the scraper's raised position, for the purpose described.

7. In a grading machine having a vehicle body and a scraper, a supporting arm carried by the body and pivoted on the scraper, and a spring adapted to press the scraper on said pivot to its operative position.

8. In a grading machine having a body and a scraper, a supporting and laterally-adjusting arm connected to the scraper and having a rack, a bearing-block swiveled on the body and having a gear meshing with the arm's rack and a stirrup guide slidably holding the arm and pivoted concentrically the gear's shaft.

9. In a grading machine having a body and a scraper comprising fore and rear members pivoted together to turn vertically, supports for the rear end of said members, comprising a vertically movable rack pivoted to the rear of one member and a cable attached to the rear of the other member, a hollow shaft journaled on the vehicle body and having a drum on which the cable is wound, and a shaft rotatable in the hollow shaft and carrying a face worm meshing with the rack's teeth.

10. In a grading machine, a vehicle body, a scraper connected to the body and at its forward end adjustable vertically and laterally in relation to the body, and traction connections directly with the forward adjustable end of the scraper.

11. In a grading machine, a vehicle having a tongue and on each side a scraper, a traction cable fastened to each scraper and to a rear whiffletree and continuing forward fastened to a fore whiffletree, a spreader for the rear whiffletree connected at one end therewith and at its other end pivoted to the opposite side of the vehicle, and a spreader for the fore whiffletrees connected therewith and having a sliding engagement longitudinally the tongue.

12. In a grading machine, a vehicle body, scrapers, one on each side of the body and adapted to move the excavated earth inwardly and toward the vehicle body, means intermediate the body and the scrapers to adjustably hold them in relation to the body, and traction connections directly with the scrapers.

13. In a grading machine, a vehicle body, scrapers, one on each side of the body and adapted to move the excavated earth inwardly and toward the vehicle body, means intermediate the body and the scrapers to adjustably hold them vertically and laterally in relation to the body, and traction connections directly with the scrapers.

14. In a grading machine, a vehicle body, scrapers, one on each side of the body, means intermediate the body and each scraper to adjustably hold it relatively to the body and the other scraper, and traction connections directly with the scrapers.

WILLIAM SYKES.

Witnesses:
  EDW. E. HINDMAN,
  E. O. KRAUSS.

---

Copies of this patent may be obtained for five cents each, by addressing the "Commissioner of Patents, Washington, D. C."